Sept. 24, 1946.                R. H. VARIAN                     2,408,115
                            STEREOSCOPIC VIEWER
                           Filed March 25, 1943          2 Sheets-Sheet 1

INVENTOR
R. H. VARIAN
BY Herbert H. Thompson
   his ATTORNEY.

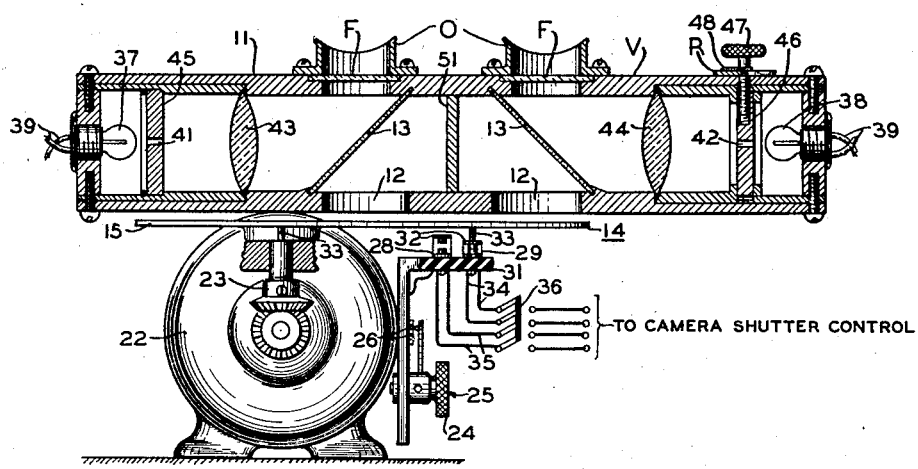
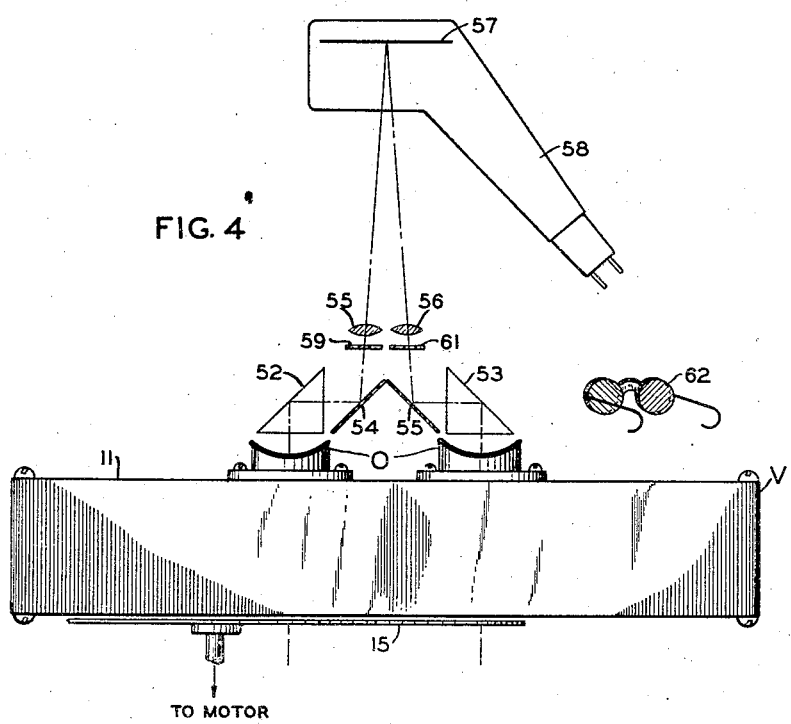

Patented Sept. 24, 1946

2,408,115

UNITED STATES PATENT OFFICE 2,408,115

STEREOSCOPIC VIEWER

Russell H. Varian, Wantagh, N. Y., assignor to Sperry Gyroscope Company, Inc., Brooklyn, N. Y., a corporation of New York Application March 25, 1943, Serial No. 480,575

5 Claims. (Cl. 88—2.6)

This invention relates to viewing devices and, more especially, to apparatus for stereoscopically viewing an object from a moving vehicle.

Extensive use has been made of the principle that hyperstereoscopic effects may be produced by extending the interocular distance, a distance between the respective points of view of the left and right eye images. In ordinary stereoscopic photography, exaggerated three-dimensional effects are produced by taking photographs with cameras positioned apart a distance exceeding the 65 millimeter spacing between the average person's eyes. Stereoscopic effects are produced as a function of the convergence angle formed by lines extending from the right and left oculars to a point on the object. When the object is located at an appreciable distance away from an observer, for example, at a distance beyond one hundred yards, stereoscopic effects are lost because the small interocular distance precludes the formation of a sufficiently large angle of convergence. Hence, when photographing distant objects stereoscopically, it is customary either to transversely displace the camera between the exposures of the respective views, or to make a photographic record of the object with two widely separated cameras, in order to emphasize three-dimensional effects.

In military and other types of aerial reconnaissance work, it is customary in forming stereoscopic photographs, to utilize the motion of the aircraft to provide the necessary separation distance or increased interocular line. In this case the respective exposures are made at intervals dependent upon the altitude above ground of the aircraft, the aircraft velocity, the focal length of the camera lens, and the extent to which the stereoscopic effects are to be emphasized. The interval between exposures ordinarily is computed as a function of the desired angle of convergence, though the absolute value of the desired angle of convergence ordinarily must be determined by trial and error.

According to the present invention, the observer may view the object from a vehicle moving across the line of sight, and may regulate the operation of the viewing device until the desired stereoscopic effects are apparent from direct observation. The improved device thereupon may provide the observer with a direct indication of the necessary time interval required between successive exposures of the camera means and the device even may include automatic control devices for governing the operation of the camera shutter means in accordance with the directly-established time interval.

The principal objects of the present invention are: to provide improved apparatus for stereoscopically viewing an object from a moving vehicle or station; to provide an improved stereoscopic viewing system wherein the eyes of the observer are exposed alternately for brief periods to the object; to provide in such a system means for determining the intervals between successive exposures, during which a translational movement of the observer's station provides the desired interocular spacing; to provide a system for determining the angular relation between the ground track and the orientation of the moving vehicle; to provide a system for continuously observing an object stereoscopically from a moving vehicle, and wherein a stereoscopic range index may be provided as an aid in determining the distance to the object; to provide a system for continuously viewing an object stereoscopically from a moving vehicle and forming images of the object on a photosensitive mosaic surface or other screen; and to provide in such a viewing system methods of and apparatus for controlling the frequency of the individual exposures, or the duration of each exposure. These and other objects will become more apparent from the following description and from the accompanying drawings showing one form of the invention as applied to use in an airplane.

In the drawings,

Fig. 3 is a sectional view through the viewing device as taken on the line 3—3 of Fig. 2.

Fig. 4 is a side elevation of the viewing device, disclosing the manner in which it may be applied to the formation of images on a screen.

Generally speaking, the invention comprehends orienting a combination range finder and stereoscopic viewing device having a common optical system so that the interocular line of the observer, or line connecting the eyes, extends generally along the direction of motion of the vehicle. The observer may view the object through a pair of oculars that are intermittently exposed for brief periods to the object, preferably during a minor portion of a recurrent cycle. The duration of each exposure and the interval between exposures may be adjusted to vary the stereoscopic effects. The determined time interval may be used to control stereoscopic camera means so as to provide a permanent record of the direct observation. The stereoscopic viewer preferably utilizes a sighting and range index device that assists in fusing the respective images into a continuous succession of stereoscopic pictures.

Figure 1:
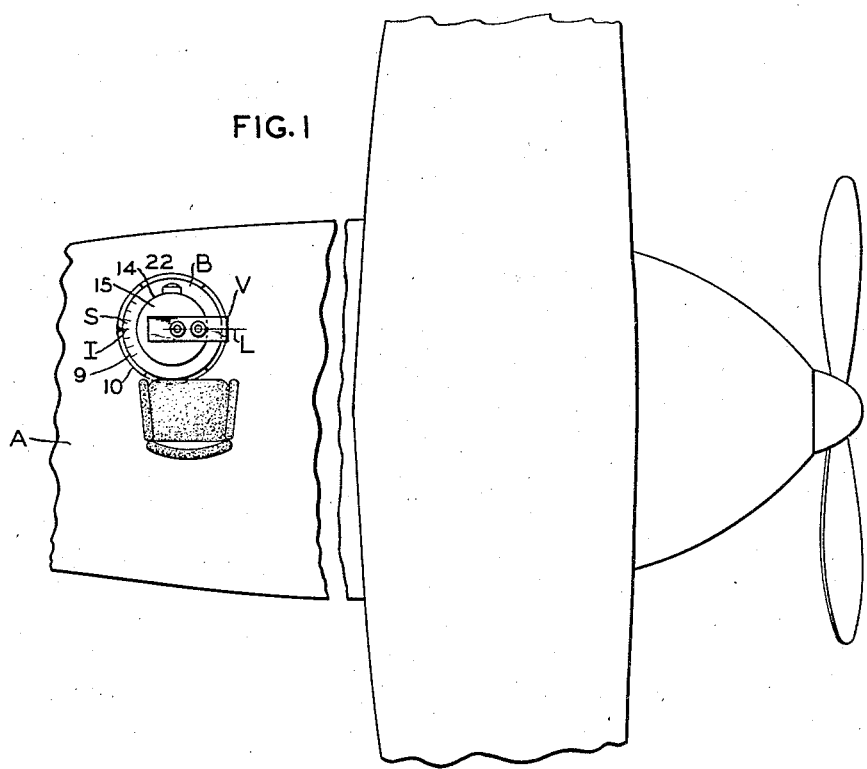
Fig. 1 is a schematic plan view of an airplane showing one form of the apparatus installed in the cabin, and arranged to provide continuous stereoscopic observation of the terrain over which the airplane travels.

As shown in the drawings, the combination range finder and viewer V is provided with a pair of oculars or eyepieces O. The range finder viewer V is oriented so that the interocular line L extends generally in the direction of the craft motion. As shown in Fig. 1, normal orientation is obtained when the line L extends along or parallel to the longitudinal axis of the aircraft. A though correction may be required for drift angle produced by cross winds. The device operates more satisfactorily when the line L extends exactly along the ground track since in this position, no shifting of the images transversely of the line L occurs between successive exposures.

The range finder viewer V is mounted on a base B comprising a movable ring 9 and a fixed flange 10. The viewer may be oriented relative to the craft until the interocular line L coincides with the ground track, in which position the images become stable, and the drift angle may be read from a scale S and index I cooperatively disposed between the parts 9 and 10. The sensitivity of the orientable viewer structure to drift angles has been found to increase materially if filters F of different colors are disposed between the object and the respective eyes of the observer, or if the images are otherwise distinctively characterized.

Thus, with the arrangement shown in Fig. 1, the observer may look through the range finder viewer V downwardly toward the terrain beneath the airplane A, and alternate left and right images are formed from points displaced along the line L. The extent of the displacement and the effects produced thereby may be varied, as will appear. Although the apparatus has been shown installed in an airplane A, it may be made to operate in a similar manner when installed on land or marine vehicles with the line L disposed in the direction of travel. Thus, if the apparatus were installed on a railroad train, the range-finder viewer may be disposed so that the line of sight through each ocular O, and the line L are both disposed horizontally.

Figure 2:
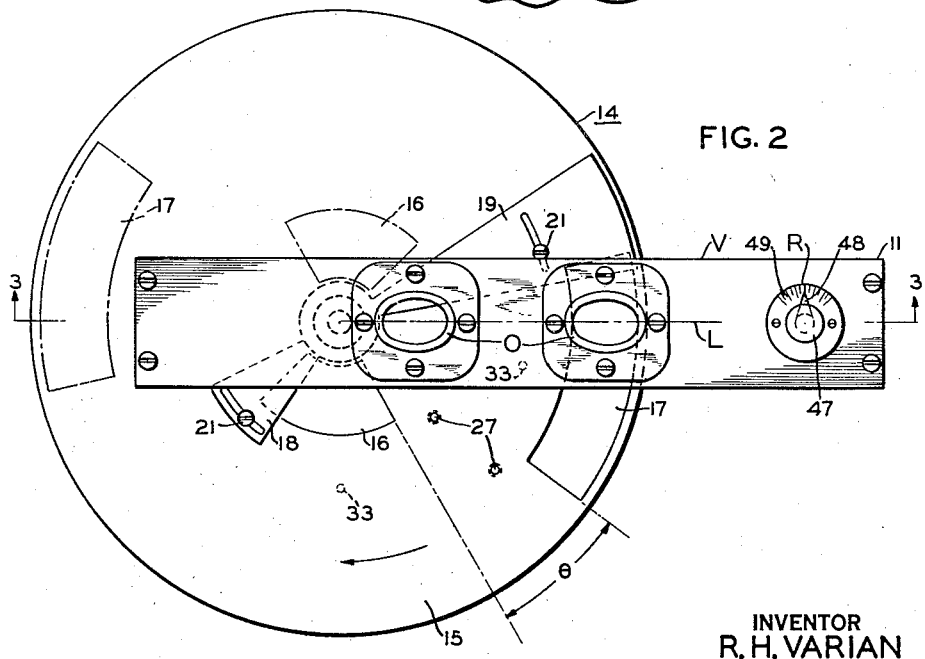
Fig. 2 is an enlarged plan view of one form of viewing device.

As more particularly indicated in Figs. 2 and 3, the range finder viewer V comprises a tubular casing 11 to the outer surface of which the oculars O are mounted in spaced relation. The oculars O correspond in position to the eyes of the observer, and are arranged to permit the observer to look through the casing 11 toward the object to be viewed. The oculars may be separate tubular members, with or without viewing lenses of the type found in ordinary field glasses. The casing 11 is provided with openings 12 opposite the oculars O, through which the line of sight extends from the eye of the observer to the object. Lightly-silvered mirrors 13 are disposed between the oculars O and the openings 12 for a purpose to be described, but do not substantially interfere with the line of sight or the formation of an image of the object.

A shutter or eclipsing means 14 is operable in any convenient manner to expose the object for brief periods alternately to the respective eyes of the observer. When the vehicle A of Fig. 1 moves from left to right, the left eye of the observer is exposed before the right eye, while if the motion is in the opposite direction, the shutter operates so as to expose the right eye first. Any form of shutter may be employed so long as it may be accurately and easily controlled.

Although either an electrically or mechanically operated shutter may be employed, a simple form of rotary shutter device is disclosed in the drawings for simplicity of illustration. As indicated in Figs. 2 and 3, the shutter 14 comprises a rotatably mounted opaque disc 15 having transparent shutter openings 16 and 17 that are adapted to align themselves periodically with the oculars O and the openings 12 to provide brief intermittent exposures of the object to the respective eyes of the observer. If the disc 15 is made of metal, the openings 16 and 17 may comprise cut-out portions. The disc 15 otherwise may be formed of any convenient transparent sheet material such as Celluloid or other cellulosic or phenolic derivative. The transparent openings 16 and 17 may comprise clear portions of the sheet material, and the remaining portions of the disc 15 may be rendered opaque with a coating of paint or other thin layer capable of obstructing light rays.

Although a metal disc 15 offers some advantages from the standpoint of ease of manufacture, good structural design, and safety in operation, forming openings in the sheet material may render the disc dynamically unbalanced, thereby causing the device to vibrate unnecessarily during operation. This defect may be overcome by forming additional openings 16' and 17' in the disc 15 positioned diametrally opposite the openings 16 and 17, respectively, so as to restore the dynamic balance of the shutter. With such duplicate openings, the disc 15 may be rotated at one-half the speed required for operation with a single pair of openings 16 and 17.

The openings 16 and 17 are staggered circumferentially so that the openings are presented to the respective oculars in succession. As shown in Fig. 2, the trailing end of the opening 16 and the forward end of opening 17 are separated by an angle $\theta$ which provides a time interval between the end of the left eye exposure and the beginning of the right eye exposure, the extent of which interval may be regulated according to the speed of rotation of the shutter 15. The successive left and right exposures preferably occur in such rapid succession as to be within the normal period of persistence of vision, whereby the images register as a single picture in the mind of the observer. In the case of an airplane traveling 300 miles per hour, or approximately 440 feet per second, exposures occurring at intervals of $\frac{1}{20}$ of a second provide an effective interocular spacing of 22 feet. This spacing may be varied by altering the airplane velocity, the time interval between exposures, or both.

The remainder of each cycle, during which the view of the object is obstructed to both eyes, preferably occupies a longer time interval than is used between the exposures of the separate eyes, so that the latter interval occupies a minor portion of the recurrent cycle. By thus proportioning the respective time intervals, a galloping exposure effect is produced, each stereoscopic picture cycle being formed of two rapidly successive images followed by a longer total eclipse period, so that the observer naturally pairs the two successive images of each cycle in their proper order. However, an observer may train himself to properly associate the images formed during each cycle, even with a reduced total eclipse period, so that all exposures follow one another by substantially equal time intervals, thereby enhancing the optical efficiency of the system. Such training may be attained by progressively altering the shutter time constants after periods of practice, until the observer's eyes become accustomed to shorter total eclipse periods without encountering pseudoscopic effects, such as may occur when the second image of one cycle is stereoscopically combined with the first image of the ensuing cycle.

Many of the disadvantages of ordinary eclipse-type stereoscopic viewers have been overcome with the present system by employing a sighting device such as a range index R that is constantly visible to the observer, even during total eclipse periods. This sighting device, hereinafter more fully described, provides a monitoring image which keeps the observer's eyes properly fused at the desired range and shortens or eliminates the brief interval required to focus on the image once it flashes into view.

The duration of the exposure of each eye is dependent upon the arc subtended between the forward and trailing edges of the respective openings 16 and 17, and by the speed of rotation of the disc 15. Preferably, the openings 16 and 17 subtend equal arcs so as to provide exposures of equal duration. The exposure time may be regulated so as to compensate for changes introduced by varying the speed of rotation when controlling the time interval between exposures. As shown in Fig. 2, the adjustment may be made conveniently by applying masks 18 and 19, adjustably positioned as by one or more screws 21 so as to obscure more or less of the openings 16 and 17, respectively. Any other convenient arrangement may be used to vary the respective time constants for each cycle of exposure.

The shutter may be operated by any form of control mechanism. In the case of the rotary shutter disclosed, use may be made of a disc-rotating motor 22 mounted so as not to obstruct the view through the respective oculars. Any suitable transmission mechanism 23 such as a flexible shaft or equivalent bevel gearing shown in Fig. 3 may be employed to transmit motion from the motor shaft to the disc 15. The motor speed may be controlled in any conventional manner so as to vary the length of the exposures and the time interval between exposures. Such speed control mechanism 24 may comprise an adjustment knob 25 cooperative with a number of contact points 26 connected in the armature or field circuit of the motor in a conventional manner through suitable resistors so as to change the motor speed by small increments as the knob 25 is turned. Since the motor speed determines the actual time interval required for the disc 15 to travel through the angle θ, and therefore the interval between exposures, the points 26 may be suitably calibrated in terms of such time intervals.

Accordingly, the observer may view a distant object through the oculars O, orienting the viewer until the line L is aligned with the ground track, as indicated by the images becoming accurately superimposed. The observer then regulates the motor speed until the necessary time interval between exposures, as a function of the speed of the vehicle and the distance to the object, produces the desired stereoscopic effect. Since the time interval may be indicated directly by the particular contact point 26 cooperating with the knob 25, the apparatus is useful as a means for determining the time interval required between successive exposures of a camera device for obtaining stereoscopic effects similar to those obtained by direct observation.

Although the masks 18 and 19 have been shown mounted for adjustment over the farthest separated edges of the openings 16 and 17, the masks may be adjustably mounted for movement over the adjacent edges of the respective openings 16 and 17 by securing the masks to the disc by threading the screws 21 in threaded holes 27. In this way the masks 18 and 19 may adjust the size of the openings as well as the angle θ to provide the desired operating conditions. By a combination of mask adjustment and motor speed adjustment, any desired range of exposures and time intervals between exposures may be produced. With the arrangement shown in Fig. 1, a cycle of operations occurs when the disc 15 has rotated through a single revolution, during which each eye of the observer is exposed alternately for a brief duration to the object. If the disc 15 is provided with a pair of shutter openings for each eye, each cycle occurs during half a revolution of the disc.

As previously pointed out, the motor speed control mechanism 24 may be used by the observer to determine the proper time interval required for the disc to travel through the angle θ. Instead of determining this time interval from the position of the knob 25 in terms of absolute time units and transferring the information for use in connection with the timing of the shutter means of a stereoscopic camera device, the apparatus shown in Figs. 1 and 2 may be provided with means for directly controlling such camera shutter means in synchronism with the operation of the disc 15. Such an automatic control may comprise a pair of switches 28 and 29, as shown in Fig. 3, of any convenient type to be operated in synchronism with the rotation of disc 15. Each of the switches may comprise a pair of normally separated contacts mounted on an insulating support 31 and on a leaf spring 32, respectively. A pair of switch operating devices 33 are fixedly or adjustably disposed on the disc 15 so as to operate the respective switches 28 and 29 sequentially. As shown in Figs. 2 and 3, the devices 33 may comprise pins projecting downwardly from the disc 15 at distances from the center of rotation corresponding to the location of the respective switches 28 and 29. As the disc rotates, the respective pins urge the leaf springs 32 downwardly until the contact members engage in the manner shown in connection with switch 29 of Fig. 2. Wires 34 and 35 may extend from the respective switches to a master switch 36, the output terminals of which may extend to a camera shutter control or other similar device. It will be apparent that when the observer has adjusted the motor speed for optimum conditions, the switch 36 may be closed, and the circuits to a shutter control mechanism may be completed through wires 34 and 35, respectively, at proper intervals so as to expose the camera device in rapid succession at points spaced by the proper interocular distance.

The range finder is incorporated in the viewing mechanism V so as to permit the observer to determine the approximate distance from the viewer to the object while providing a sighting device that aids the observer in concentrating on the location of the stereoscopic picture while the object is masked from view. Such a range finder control R is disclosed in Figs. 2 and 3, and may utilize any conventional range-finding mechanism. One simple form may comprise an adjustable image-forming system capable of forming images translatable along the line of sight and which may be made to coalesce or fuse in the plane of the object image and thereby provide an indication of the object distance and at the same time to maintain proper convergence angle of the eyes while the object is screened from view. One such system, as shown in Fig. 3, may comprise a pair of light sources 37 and 38 centrally disposed at opposite ends of the casing 11. The light sources may comprise low-power flashlight bulbs having suitable wire connections 39 extending to a suitable power source. Relatively displaceable images of the illuminated apertures 41 and 42 are formed in space, as by lenses 43 and 44. The aperture 41 is formed in a fixed aperture plate 45, while the aperture 42 is formed in movable aperture plate 46, adjustable laterally of the casing 11 as by a threaded adjustment knob 47. The adjustment knob 47 may be provided with a pointer 48 and an index scale 49 suitably calibrated, for example, in linear units representing object distance. A partition 51 isolates the light source 38 from the source 37.

In operation, the lenses 43 and 44 form images of the apertures 41, 42 which are reflected toward the observer from the lightly silvered or plain glass mirrors 13. The resulting images appear as two separated light spots lying along the line of sight, which spots may be made to coalesce and appear to lie in the plane of the object by suitable adjustment of the knob 47, and the range or distance may be indicated by the scale 49. Since the light spots are not affected by the shutter 14, the spots provide a permanent center of focus for the eyes of the observer and discipline the eyes by maintaining them properly converged between intermittent exposures of the object.

In Fig. 4 the invention has been shown applied to the formation of real images, or television pictures that enable the observer to view the object from a remote point. The viewer V may be of the type shown in Figs. 2 and 3, modified by the addition of prisms 52 and 53 or other similar reflecting devices combined with mirrors or prismatic means 54 and 55 so that images may be formed by suitable lenses 55 and 56 from the binocular viewer onto a single screen 57. If the screen 57 comprises the photosensitive surface of a television camera tube 58, only one ocular is needed, with shutter means adapted to form galloping left and right eye images alternately, which images may be televised in the usual manner to form television images at a remote station where the successive images may be viewed by the left and right eyes alternately. However, the images may be formed on any plane-reflecting surface of screen 57 that may be viewed directly by the observer. In the latter case, the respective images may be formed with apparatus as shown in Fig. 4, the images being characterized in some suitable manner so as to render alternate images visible only to the left and right eyes, respectively. As an example, filters 59 and 61 may be interposed in the path of each image-forming beam to characterize the resulting images in terms of color, plane of polarization, or the like, and the observer may wear spectacles 62 having similar filters for rendering the images visible to only one eye. Thus, if the filters 59 and 61 comprise polarizing screens with the planes of polarization mutually separated by a convenient angle, e. g., 90°, the observer may view the resulting images stereoscopically by viewing the images through a similar pair of filters oriented in the spectacles 62 so as to block out the unwanted image in the respective eyes.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A unitary range finder and stereoscopic viewer for observers on vehicles traveling transversely of a line of sight to an object, comprising a non-prismatic binocular device having a pair of oculars through which the observer may view said object, shutter means operable to provide a brief exposure of the view through each ocular, adjustable speed-control means for said shutter for recurrently operating the same to provide successive exposures of each ocular and thereby give a resultant series of overlapping views simulating a stereoscopic view of the object on which the eyes of the observer may converge, and a calibrated range-measuring system in the optical system of the viewer having visual indices adjustable in the line of sight to coincidence with the said stereoscopic image and focus the same in the viewer, and simultaneously determine the range distance to said object.

2. A combination range finder and stereoscopic viewer for observers in vehicles traveling transversely of a line of sight to an object, comprising a non-prismatic optical device effective to produce an image on which the eyes of the observer may converge and which is variable according to ground speed, shutter rate, and range, said device having a pair of oculars through which the observer may view said object, a pair of shutters providing a brief exposure of the view of the object through each ocular, calibrated control means for recurrently operating said shutters in succession to present a continuous series of overlapping views of the object and give a stereoscopic image of the object, and a range finder including said pair of oculars and providing an indication of the distance of said object, said range finder comprising a second adjustable, visual index-forming device adjustable to provide a visual index in the line of sight of the steroscopic image and calibrated to be moved in coincidence therewith to indicate the distance to said object.

3. A unitary range finder and stereoscopic viewer for observers on vehicles traveling transversely of a line of sight to an object, comprising a non-prismatic binocular device having a pair of oculars through which the observer may sight and view said object, a pair of shutters mounted to provide a brief exposure of the view through each ocular, calibrated control means for recurrently operating said shutters in succession to and at a speed determined conjointly by the range distance and speed of the vehicle to give a continuous series of overlapping views forming a stereoscopic image of the object, the range finder including the optical system of said viewer and said oculars and adapted to impose a coaxial visible index on said variable stereoscopic image and on which the eyes of the observer may converge, said range finder including calibrated means for forming said visible index comprising light spots continuously visible in the field of view of said stereoscopic image, at least one of said light spots being adjustable in the line of sight by said calibrated means to vary their separation distance to bring them into coincidence with the image and thereby determine the distance to said object.

4. In a non-prismatic combination range finder and stereoscopic viewer having a common pair of oculars through which an object may be viewed by an observer being translated relative to said object along an interocular line of travel, adjustably controlled shutter means adapted to alternately mask and expose each of said oculars, said shutter control means being adjustable according to speed of translation and range distance and said shutters operable to provide alternate, brief, staggered exposures of said object through said respective oculars to form overlapping views of said object on which the eyes of the observer may converge and thereby give the desired variable stereoscopic image effect, and means for imposing a pair of indices upon the variable stereoscopic image in the line of sight thereof to determine the range distance of the viewed object.

5. A range finder for viewing targets from moving vehicles comprising a non-prismatic viewer of fixed optical axes, range distance-determining elements operable to form visual indicia in said optical axes, and shutter masks for said viewer operable according to the speeds of the vehicles and the range distance to establish overlapping views simulating stereoscopic images of viewed targets on which the eyes of the observer may converge coincident with the said optical axes and the visual indicia.

RUSSELL H. VARIAN.